(12) United States Patent
Yamamoto et al.

(10) Patent No.: US 7,661,774 B2
(45) Date of Patent: Feb. 16, 2010

(54) TRACK COMPRISED OR INTERNAL AND EXTERNAL LINKS

(75) Inventors: Teiji Yamamoto, Hirakata (JP); Kazuo Maeda, Hirakata (JP)

(73) Assignee: Komatsu, Ltd., Tokyo (JP)

( * ) Notice: Subject to any disclaimer, the term of this patent is extended or adjusted under 35 U.S.C. 154(b) by 190 days.

(21) Appl. No.: 11/896,526

(22) Filed: Sep. 4, 2007

(65) Prior Publication Data

US 2008/0164756 A1    Jul. 10, 2008

Related U.S. Application Data

(63) Continuation-in-part of application No. 10/727,573, filed on Dec. 5, 2003, now Pat. No. 7,325,889.

(30) Foreign Application Priority Data

Jan. 29, 2003  (JP)  ............................. 2003-019879
Nov. 28, 2003  (JP)  ............................. 2003-399218

(51) Int. Cl.
*B62D 55/21* (2006.01)
(52) U.S. Cl. .................. 305/201; 305/187; 305/202
(58) Field of Classification Search .............. 305/104, 305/106, 185, 187, 195, 196, 198, 200, 201, 305/202, 59
See application file for complete search history.

(56) References Cited

U.S. PATENT DOCUMENTS

| | | | |
|---|---|---|---|
| 3,595,572 A | 7/1971 | Granda | |
| 3,784,262 A | 1/1974 | Kaizaki et al. | |
| 4,083,611 A * | 4/1978 | Schaffner et al. | 305/186 |
| 4,288,172 A | 9/1981 | Livesay et al. | |
| 4,457,521 A * | 7/1984 | Morley | 305/103 |
| 5,172,965 A | 12/1992 | Taft | |
| 5,183,318 A | 2/1993 | Taft et al. | |
| 5,201,171 A * | 4/1993 | Anderton et al. | 59/7 |

(Continued)

FOREIGN PATENT DOCUMENTS

DE    4410388 A1    9/1995

(Continued)

OTHER PUBLICATIONS

Japanese Office Action dated Dec. 9, 2008 for corresponding Japanese Application 2003-399218.

(Continued)

*Primary Examiner*—Russell D Stormer
(74) *Attorney, Agent, or Firm*—Rader, Fishman & Grauer PLLC

(57) ABSTRACT

In a track with a rotatable bushing which is brought into engagement with a sprocket of a track-type vehicle, it is intended that strength is enhanced rationally by link functionality sharing and by combination of such assigned functional tasks for achieving further improvements in rotatable bushing function. To this end, a first bolt insertion hole provided in a track shoe mount surface of an external link and a second bolt insertion hole provided in a track shoe mount surface of an internal link are arranged on the same straight line, and a straight line connecting the first bolt insertion hole and the second bolt insertion hole is situated at a position more interior than a contact plane of the external link and internal link.

3 Claims, 9 Drawing Sheets

U.S. PATENT DOCUMENTS

| | | | |
|---|---|---|---|
| 5,829,849 A | 11/1998 | Lawson | |
| 6,074,022 A * | 6/2000 | Anderton et al. | 305/103 |
| 6,206,491 B1 | 3/2001 | Hisamatsu et al. | |
| 6,322,173 B1 | 11/2001 | Maquire et al. | |
| 6,371,577 B1 | 4/2002 | Hasselbusch et al. | |
| 6,564,539 B2 | 5/2003 | Bedford et al. | |
| 6,866,351 B2 | 7/2003 | Yamamoto | |
| 6,783,196 B2 | 8/2004 | Maguire et al. | |
| 2002/0145336 A1 | 10/2002 | Bottom et al. | |
| 2003/0141760 A1 | 7/2003 | Yamamoto | |
| 2006/0181151 A1 | 8/2006 | Wodrich et al. | |

FOREIGN PATENT DOCUMENTS

| | | | |
|---|---|---|---|
| JP | 54-4206 Y | 2/1979 | |
| JP | 58-067572 A | 4/1983 | |
| JP | 06-504747 A | 6/1994 | |
| JP | 10-167131 | 6/1998 | |
| JP | 2001/347972 A | 12/2001 | |
| JP | 2001/347973 A | 12/2001 | |
| JP | 2001/347974 A | 12/2001 | |
| JP | 2003/220983 A | 8/2003 | |
| WO | WO-93/11020 | 6/1993 | |

OTHER PUBLICATIONS

CN Office Action (6 pages) with English translation (3 pages), Issuing Date: Feb. 16, 2007.

* cited by examiner

TRACK COMPRISED OR INTERNAL AND EXTERNAL LINKS

CROSS REFERENCE TO RELATED APPLICATION

The present application is a Continuation-In-Part of the patent application Ser. No. 10/727,573, filed Dec. 5, 2003, and issued as U.S. Pat. No. 7,325,889, which claims priority to application JP-2003-019879 filed on Jan. 29, 2003 and application JP-2003-399218 filed on Nov. 28, 2003, the entire contents of which are incorporated herein by reference.

TECHNICAL FIELD

The present invention relates to a track for use in track-type vehicle. More particularly, this invention is directed to a track with a rotatable bushing intended for achievement of improvement in the strength of a connection part comprising a combination of an internal link and an external link.

BACKGROUND ART

A known track on the undercarriage of a track-type vehicle (such as a hydraulic excavator, bulldozer et cetera) comprises endlessly-coupled track links and track shoes mounted on the respective track links. The track is passed around a sprocket and an idler which are supported on the vehicle frame and disposed with a required spacing. Engaged with the sprocket of the drive wheel, each track link is driven. The track is supported by track rollers and carrier rollers disposed between the sprocket and the idler in the vehicle frame. The track-type work vehicle travels by such arrangement.

As shown in FIGS. 9(a) and 9(b), a track link of the track of the above-described type is, in general, a single link (a link assembly 70) formed by interconnecting offset type link pieces 71, 71, which are formed symmetrically relative to the width-wise direction, by a track bushing 72, with a space left therebetween. Such link assemblies 70 are connected together sequentially by coupler pins 73 inserted into associated track bushings 72. A track shoe 75 is fixedly fastened to an end surface corresponding to the ground contact side of each link assembly 70 by a bolt and nut. More specifically, the bolt is passed through a bolt insertion hole 74 extending in a direction orthogonal to the axial direction of the coupler pin 73 at an intermediate position of the link piece 71. In the track 60, the track bushing 72 situated at a connecting portion of adjoining track links (link assemblies 70) engages with the teeth of a sprocket (not shown), and power supplied from the sprocket is transmitted, via the track bushing 72, to the coupler pin 73, to the pair of link pieces 71, 71, and then to the track shoe 75.

In the track 60 of the above-described type, the track bushing 72 that intermeshes with the teeth of the sprocket is fixed to the link pieces 71, 71. The track bushing 72 functions not only as a bearing member constituting a turning pair in the link assembly 70 but also as a power transferring member capable of direct transmission of power from the sprocket. Therefore, the external peripheral surface of the track bushing 72 receives a surface pressure caused by slide contact with the tooth surface of the sprocket and undergoes relative slipping occurring when engaged with the sprocket. However, since both ends of the track bushing 72 are fixed to the pair of link pieces 71, 71, the external peripheral surface of the track bushing 72 locally receives a surface pressure and relative slipping. Accordingly, in the conventional track 60, the track bushing 72 wears off at an early stage, and the frequency of replacement of the track bushing 72 is high, thereby producing the problem that running costs increase.

There are techniques known in the art (JP, 06-504747, B(1994) (published Japanese translations of PCT international publication for patent applications) and Japanese Utility Model Kokoku Publication No. 54-4206 (1979)), which are capable of providing solutions to the aforesaid problems. In such techniques, a track bushing is divided into three sub-bushings. Of these sub-bushings, one situated in the middle and brought into engagement with the teeth of a sprocket is formed so as to be rotatable (this sub-bushing is hereinafter referred to as a "rotatable bushing"). This construction allows the track bushing to engage smoothly with the teeth of the sprocket and reduces relative slipping at the time of engagement, thereby preventing the bushing from wearing off at an early stage. In addition to these prior art techniques, there is another technique that is disclosed in the Applicant's previous patent application (Japanese Patent Application No. 2003-220983).

In the track link according to the aforesaid 06-504747 technique, the track bushing is divided into three sub-bushings. Of these three sub-bushings, the intermediate sub-bushing is made rotatable on a coupler pin. As a result of such arrangement, the other sub-bushings situated on both sides of the intermediate sub-bushing are press-fitted into the inside of mount holes provided in the link pieces and serve as bearing bushings for the coupler pin. In this construction assembled as a link assembly, the pair of link pieces and the coupler pin are merely rigidly joined to each other, so that there occurs a high stress between the pin mount part and the track shoe mount part. Therefore, the track link of this technique presents the problem that rigidity falls considerably, in comparison with conventional tracks without rotatable bushings.

Additionally, in the link assembly connection part, for the provision of a seal member for providing sealing between a bushing end and a link piece located on the coupler pin fixing side, such a structure that a sealing member is fitted into the coupler pin side of the link is employed. This not only makes the machining work troublesome but also produces the problem that the assembling work becomes complicated. Furthermore, the aforesaid 54-4206 technique lacks strength on the coupler pin side of the link piece, which causes the same problem as does the 06-504747 technique.

The present invention was made with a view to providing solutions to the problems presented by the prior art techniques. Accordingly, a general object of the present invention is to provide a track with a rotatable bushing having strength rationally increased by link functionality sharing and by combination of such assigned functional tasks, and capable of achieving further improvements in the function of the rotatable bushing.

SUMMARY OF THE INVENTION

In order to achieve the aforesaid object, the present invention provides a track for use in a track-type vehicle. The track of the present invention includes track links, a coupler pin, a rotatable bushing, a coupler pin hole, a bushing hole, a fixed bushing, a first bolt insertion hole and a second bolt insertion hole. Each track link is constructed by alternately interconnecting an external link and an internal link. The coupler pin couples the external link and the internal link. The rotatable bushing is interposed between the right and left internal links and is rotatably supported by the coupler pin. The coupler pin hole is provided in the external link and the coupler pin is press-fitted into the coupler pin hole. The bushing hole is provided in the internal link. The fixed bushing is interfittingly inserted into the bushing hole. The first bolt insertion hole is provided in a track shoe mount surface of the external link. The second bolt insertion hole is provided in a track shoe mount surface of the internal link. The first bolt insertion hole and the second bolt insertion hole are arranged on the same straight line. The same straight line connects the first bolt insertion hole and the second bolt insertion hole and is situated at a position more interior than a contact plane of the external link and internal link.

According to the invention, since the first bolt insertion hole provided in the track shoe mount surface of the external link and the second bolt insertion hole provided in the track shoe mount surface of the internal link are arranged on the same straight line, all the track shoes used for the track can be the same type of tracks so that the type of the track shoes can be uniformed. In addition, since the straight line connecting the first bolt insertion hole and the second bolt insertion hole is situated at a position more interior than the inner end surface of the coupler pin hole of the external link, the configuration of the internal link when viewed in plan can be made such that the flexion angle of a portion, which changes in sectional shape from the external end surface of the bushing hole of the internal link, with respect to the external end surface can be reduced. As a result, stress concentration can be avoided in the area most liable to rigidity shortage due to stress concentration.

Preferably, the track according to the invention is configured such that the thickness dimension of the bushing hole provided in the internal link is greater than the thickness dimension of the coupler pin hole provided in the external link. This increases the strength of the bushing incorporation side and makes the stresses imposed on the internal and external links uniform, so that the problem of rigidity shortage in the bushing side link (internal link) can be solved. Therefore, a well-balanced track link and, in consequence, a track having increased strength can be achieved.

Preferably, the track according to the invention is configured such that the inner circumferential surface of the fixed bushing in the internal link has a tapered surface that is getting larger outwardly. This mitigates the stress imposed on the internal link.

BEST MODE FOR CARRYING OUT THE INVENTION

Figure 1:
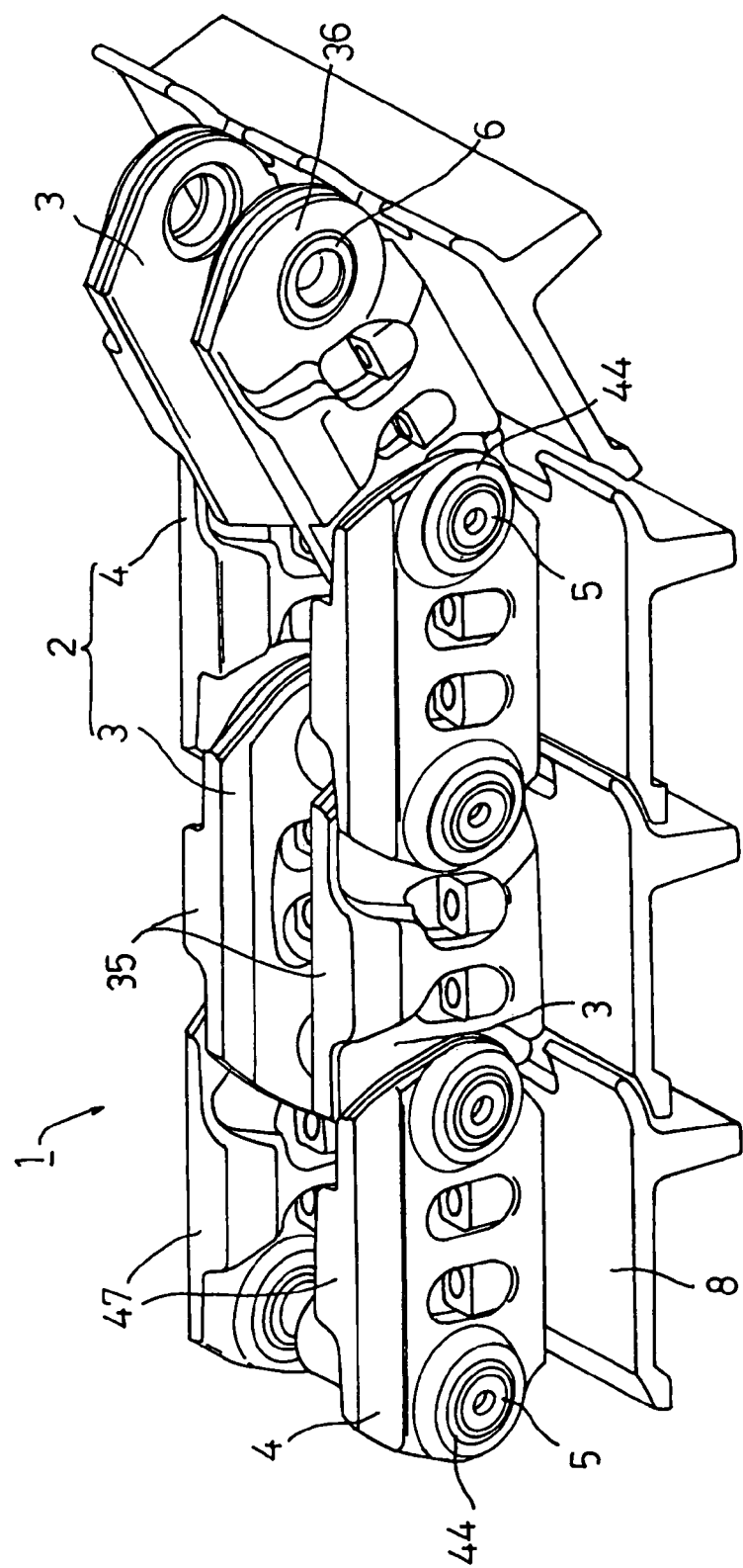
FIG. 1 is a partial perspective illustration of a track according to an embodiment of the present invention.

Hereinafter, referring to the drawings, a specific embodiment of a track with a rotatable bushing and a link for a track with a rotatable bushing according to the present invention will be described.

Figure 2:
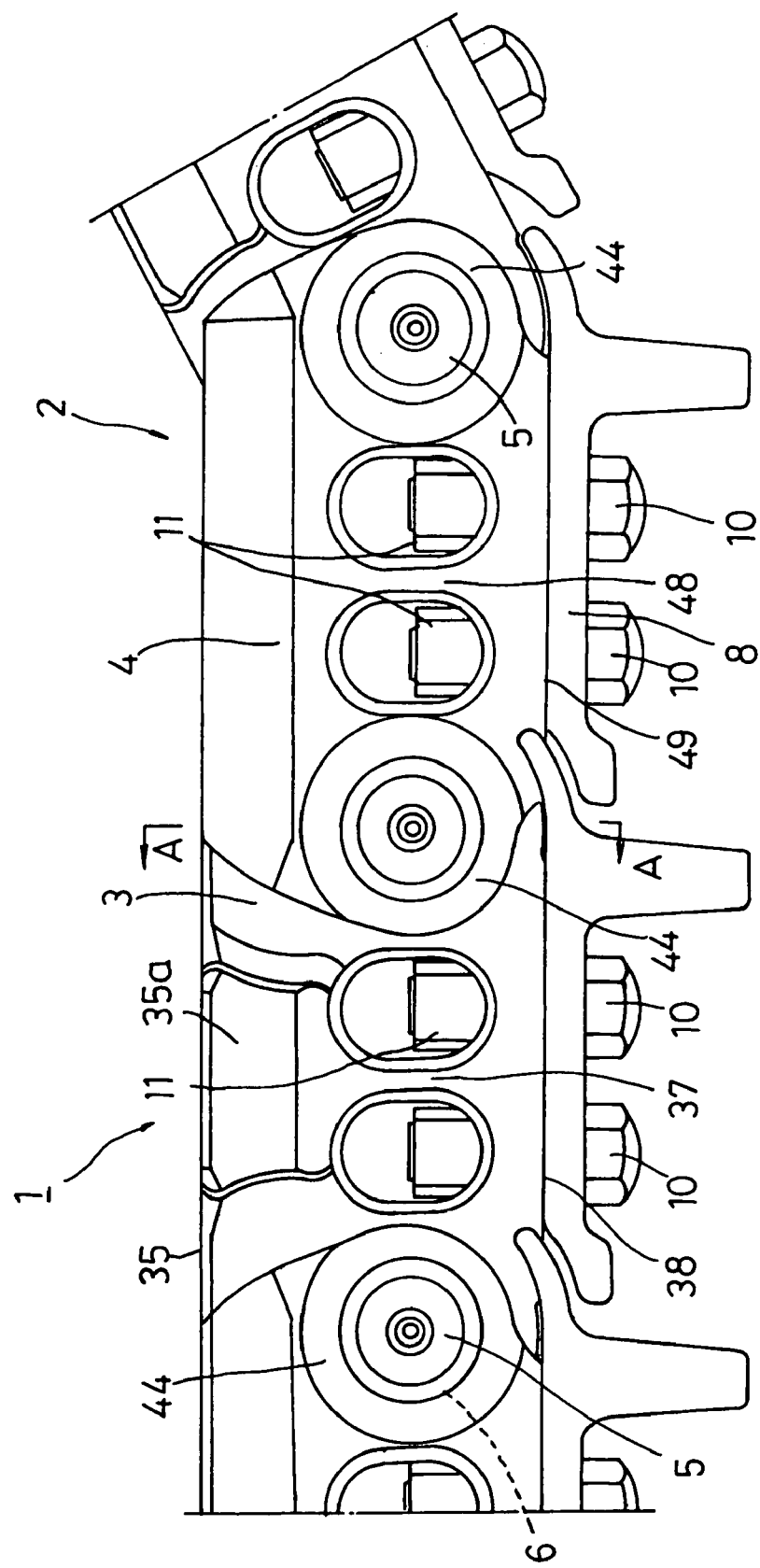
FIG. 2 is a partial front view of the track.
Figure 3:
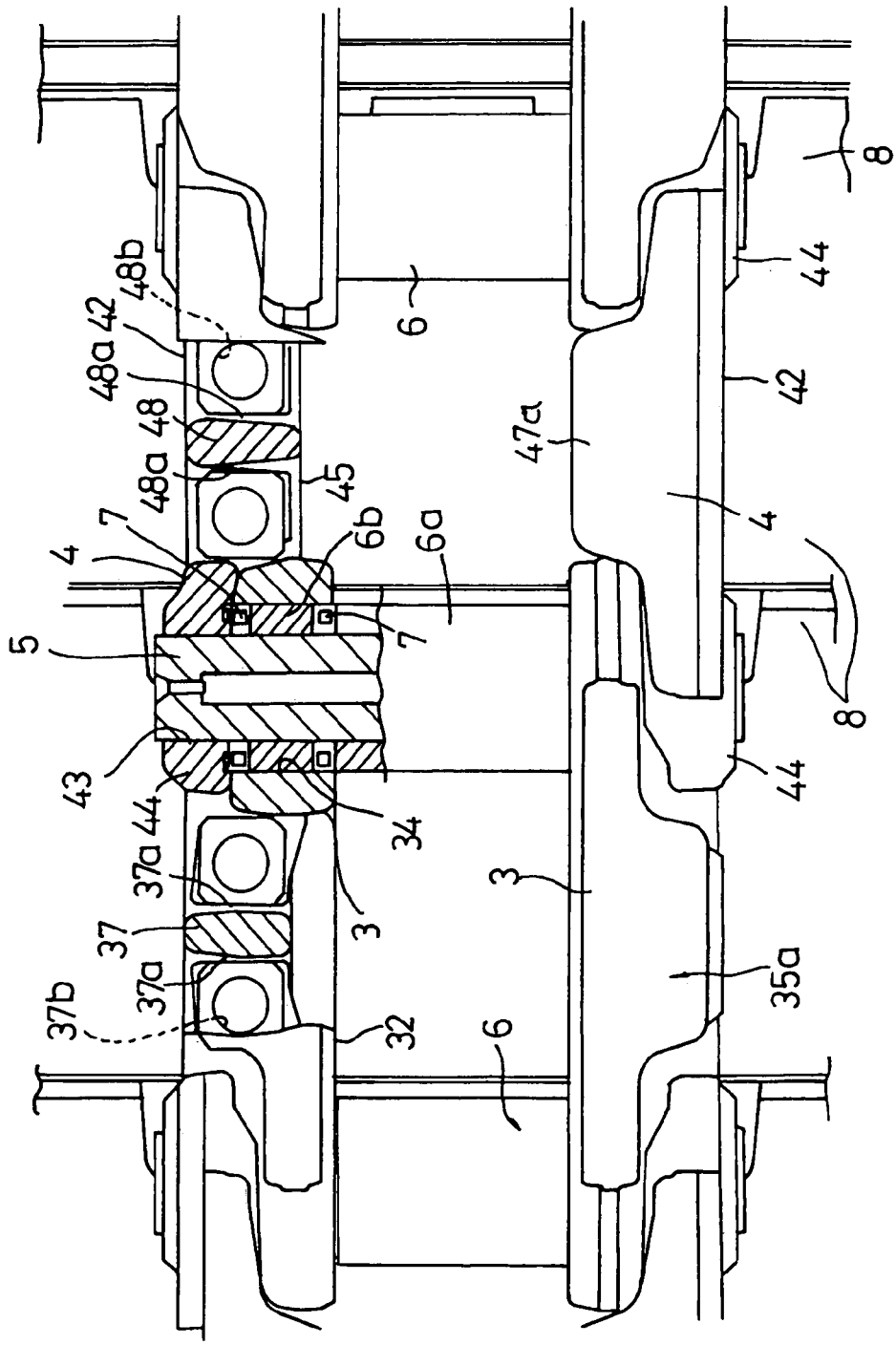
FIG. 3 is a top plan view showing, in cross section, a part of FIG. 2.
Figure 4:
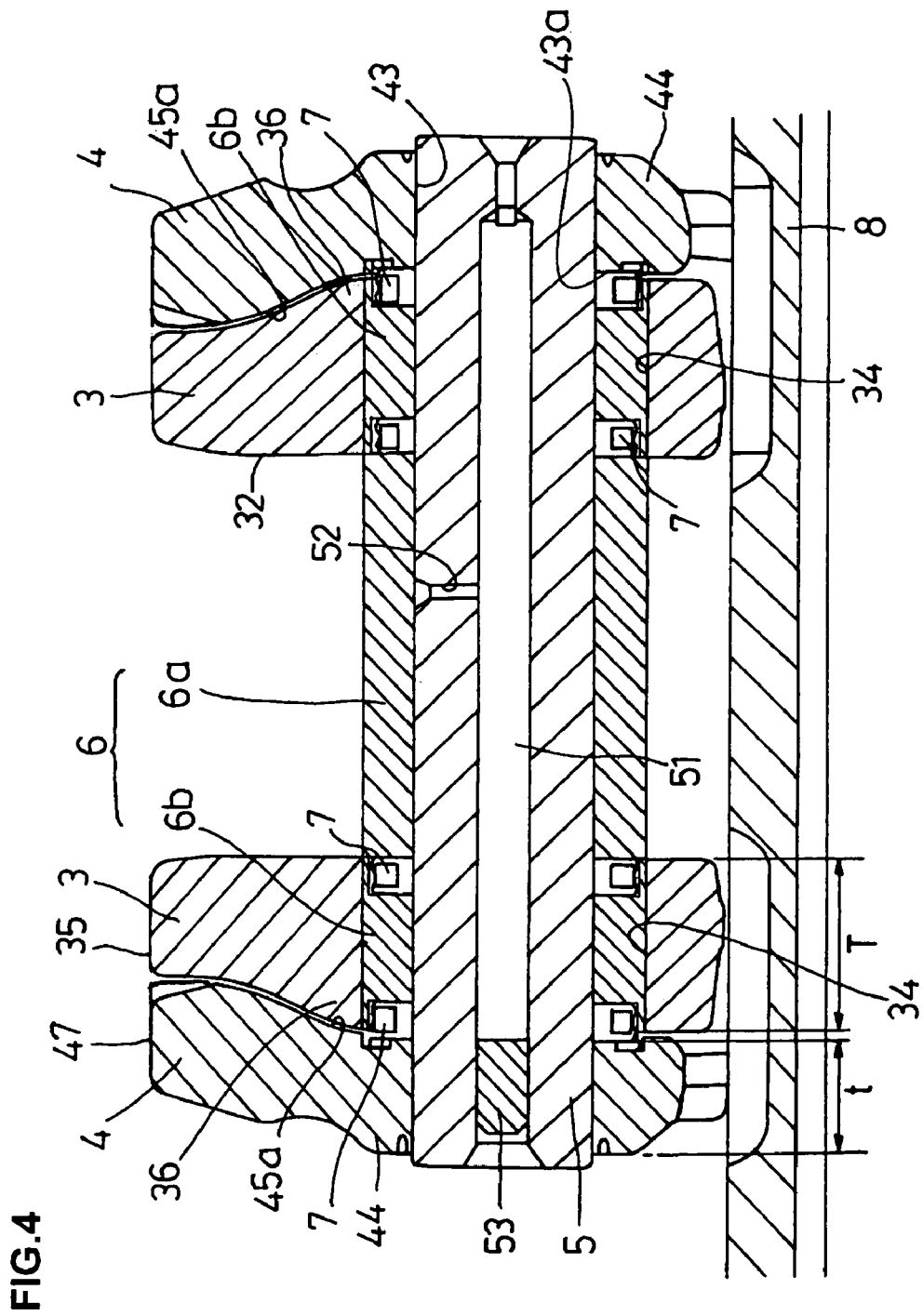
FIG. 4 is an enlarged cross sectional view taken on the line A-A of FIG. 2.
Figure 5:
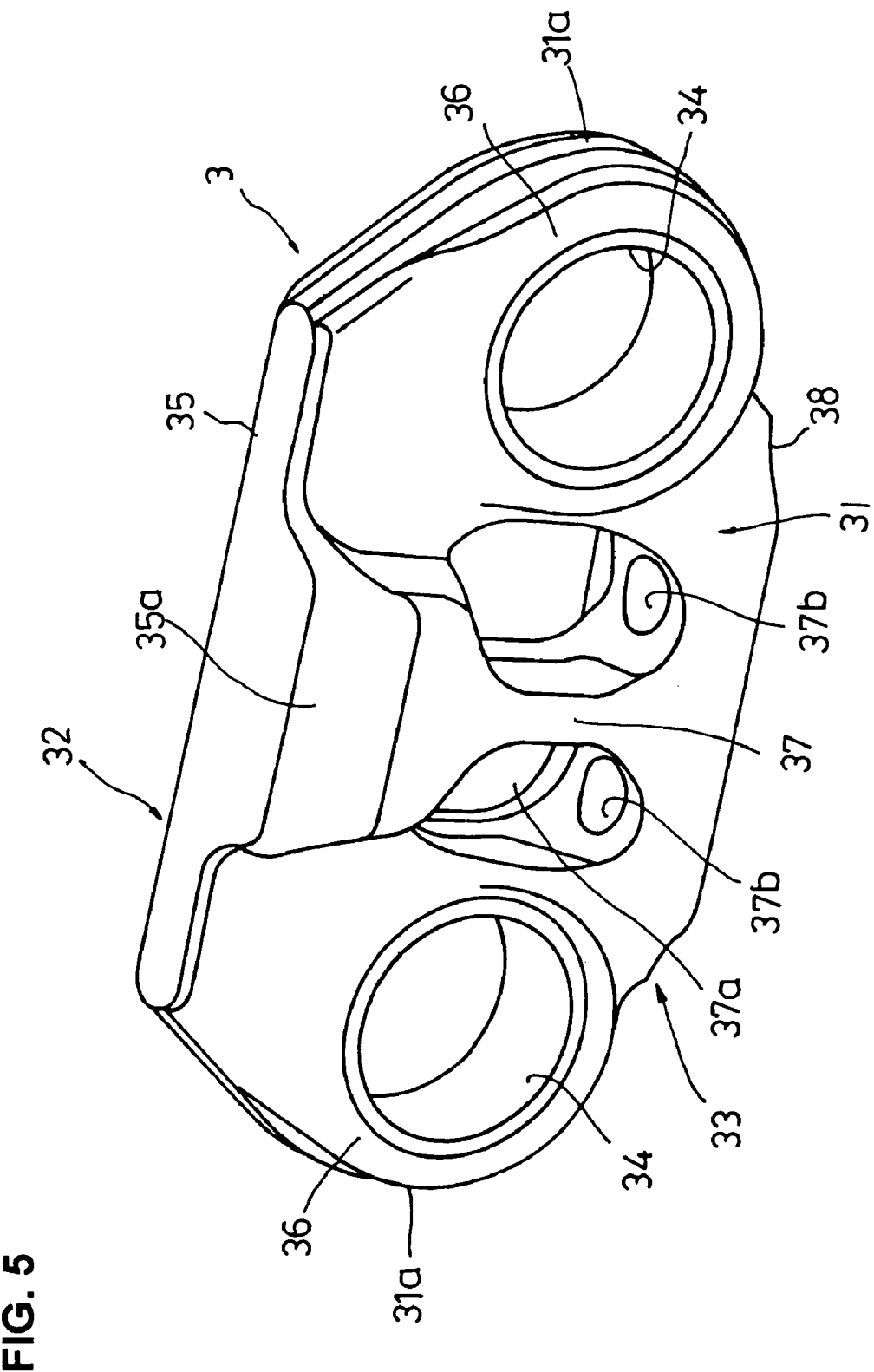
FIG. 5 is a perspective illustration of an internal link of the track of the present embodiment.
Figure 6:
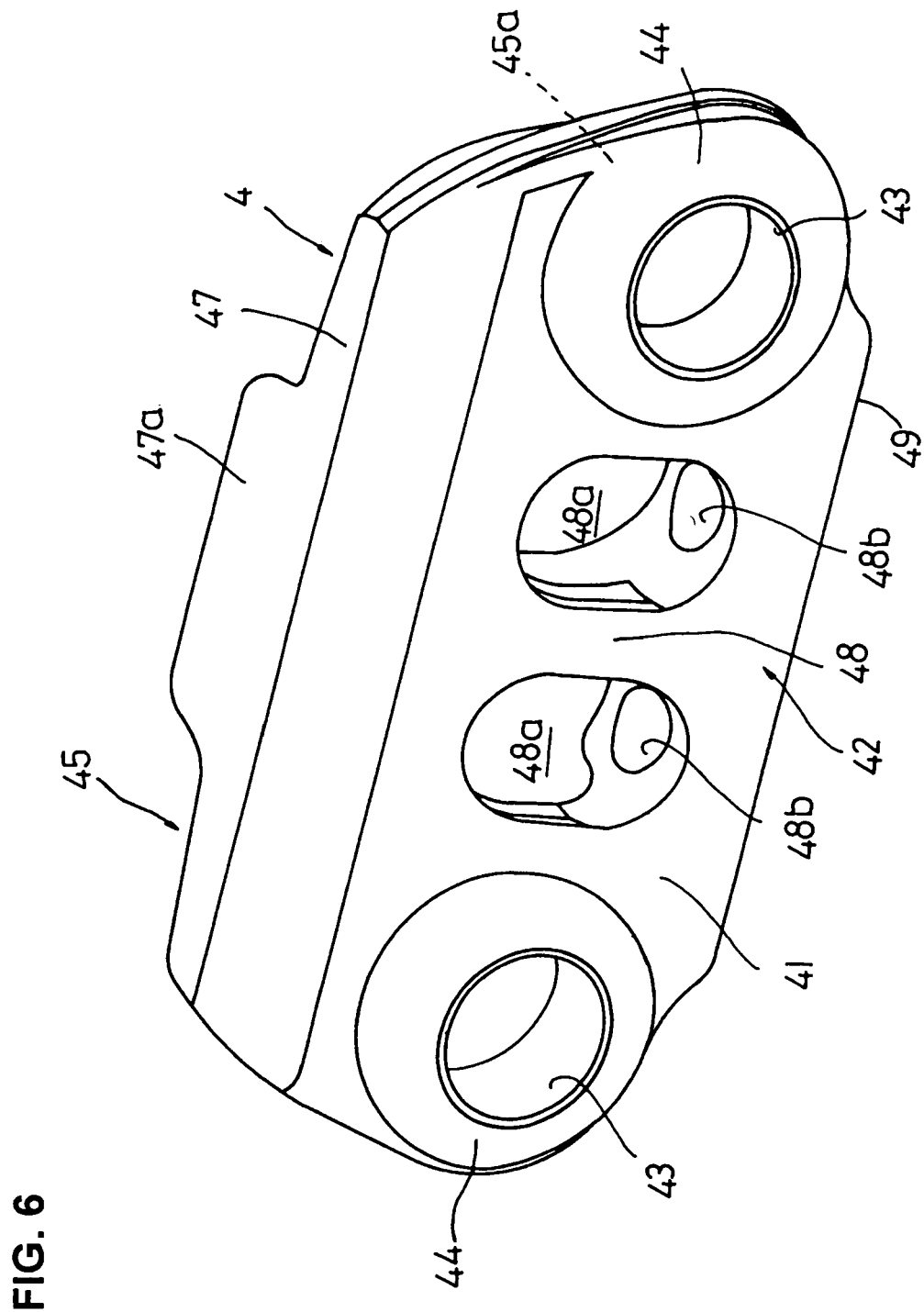
FIG. 6 is a perspective illustration of an external link of the track of the present embodiment.

FIG. 1 is a partial perspective illustration of a track according to an embodiment of the present invention. FIG. 2 is a partial front view of the track. FIG. 3 is a top plan view showing, in cross section, a part of FIG. 2. FIG. 4 is an enlarged cross sectional view taken on the line A-A of FIG. 2. FIG. 5 is a perspective illustration of an internal link of the track. FIG. 6 is a perspective illustration of an external link of the track.

A track with a rotatable bushing 1 of the present embodiment is usually incorporated into the undercarriage (not shown) of a track-type construction machine (work machine) such as a hydraulic excavator, a bulldozer et cetera. As partially shown in FIG. 1, the track with a rotatable bushing 1 (hereinafter called the "track 1") comprises track links 2, wherein internal and external links 3, 4 are alternatively arranged at required intervals in right and left lines relative to the width-wise direction and are assembled to respective track shoes 8 disposed on the ground contact surface side by means of bolt fastening. The internal and external links 3,4 in large numbers are interlinked in an endless manner by the use of coupler pins 5 and bushings 6, and the track shoes 8 are mounted on the ground contact surface side of the links 3, 4.

The track links 2 of the track 1 are formed such that the external and internal links 3,4 are, as described above, arranged symmetrically with respect to the coupling direction axial line and alternately assembled serially, being interlinked by the coupler pins 5 and bushings 6. Since the internal and external links 3, 4 are symmetrical in shape, those situated on one side will be described hereinafter.

Firstly, the internal link 3 has a main body part 31. In the main body part 31, its inside surface 32 is formed into a flush flat surface. It should be noted that the inside surface 32 is a surface of the internal link 3 (or external link 4) opposed to another internal link 3 situated on the opposite side when assembled as the track link 2 and, in other word, a surface that travels along the track drive sprocket. The opposite surface to the inside surface 32 is hereinafter referred to as the "outside surface 33". In the main body part 31, a hole 34 (hereinafter referred to as the "bushing hole 34") for the bushing 6, which is externally interfitted onto the coupler pin 5 provided at predetermined pitches, is so formed as to extend orthogonally to the inside surface 32. Additionally, an upper surface of the internal link 3 serves as a tread, and a projecting part 35a, for securing the tread 35 when the internal link 3 is assembled, is projectingly provided in an upper half part of the internal link 3 situated between the bushing holes 34, 34 such that it projects a required distance from the outside surface 33. Furthermore, a pillar 37 is vertically provided under the projecting part 35a in the middle of the main body part 31. Through holes 37a, 37a are provided on the respective sides of the pillar 37, passing completely through from one side to the other. Bolt insertion holes 37b, 37b are penetratingly formed at predetermined pitches, each extending from a lower side of its associated through hole 37a in a direction orthogonal to a lower end surface (i.e., a track shoe mount surface 38). The track shoe mount surface 38 is a surface in a parallel relationship with a plane connecting the centers of the bushing holes 34, 34, and the tread 35 is also formed into a flat surface running parallel with the track shoe mount surface 38. Each end 31a of the main body part 31 is shaped like a circular arc with a required radius on the basis of the axis of the bushing hole 34. The whole main body part 31 is formed symmetrically with respect to its central vertical axis when viewed from the front.

As can be seen from FIG. 4, a boss part 36 forming a part of a frustum which gently lifts upward is provided on the side of the outside surface 33 of the bushing hole 34 in the internal link 3. The boss part 36 has an outer shape continuing smoothly to the tread 35. Therefore, in the present embodiment, the axial-wise length of the bushing hole 34 (thickness T) is about 1.5 times the axial-wise length (thickness t) of a coupler pin press-fit hole (coupler pin hole 43) in the external link 4 which will be described later.

On the other hand, the external link 4 has a main body part 41 the contour of which is almost the same as the aforesaid internal link 3, and has coupler pin holes 43, 43 provided at the same pitch as of the bushing holes 34, 34 of the internal link 3. The outside surface 42 of the external link 4 is made flat. The external link 4 is so formed as to have boss parts 44 in the shape of a frustum, whereby the circumferential area of each coupler pin hole's 43 formation part gently lifts upward. Additionally, in the inside surface 45 of the external link 4, the circumferential area of each coupler pin hole 43 is formed into a concave surface (i.e., a concavely curved surface 45a) corresponding to the shape of the boss part 36 of the outside surface 33 of the internal link 3. Additionally, as in the internal link 3, a projecting part 47a, for securing a tread 47 when the external link 4 is assembled, is projectingly provided in an upper half part situated intermediately between the coupler pin holes 43, 43 such that it projects a required distance from the inside surface 45. Furthermore, a pillar 48 is vertically provided under the projecting part 47a in the middle of the main body part 41. Through holes 48a, 48a are respectively provided on the sides of the pillar 48, passing completely through from one side to the other in the external link 4. Bolt insertion holes 48b are penetratingly provided at predetermined pitches, each passing through from the lower side of its associated through hole 48a in a direction orthogonal to a lower end surface (i.e., a track shoe mount surface 49).

The coupler pin 5, for the assembling of the track links 2 made up of the internal and external links 3, 4 alternately arranged, is passed through the inside of the bushings 6 interfitted to the bushing holes 34 of the internal links 3. Both ends of the coupler pin 5 are press-fitted into the coupler pin holes 43 of the external links 4, 4 and the outer end thereof is caulked at an outer surface of the boss part 44 and is firmly fixed. The coupler pin 5 is provided with a lubricant filling hole 51 in the axial center thereof. The lubricant filling hole 51 is charged with a lubricant injected from the outside through one outer end thereof. Additionally, provided in the middle of the coupler pin 5 is a lubricant supply small hole 52 for a contact surface in contact with a rotatable bushing 6a which will be described later, so that the lubricating property of the rotatable bushing 6a can be ensured. Reference numeral 53 of FIG. 4 denotes a plug.

On the other hand, the bushing 6 to be interfitted onto the coupler pin 5 is divided into three sub-bushing portions, namely fixed bushings 6b, 6b respectively interfitted into the inside of the bushing holes 34 of the right and left internal links 3, 3, and the aforesaid rotatable bushing 6a interposed between the right and left internal links 3, 3 and supported rotatably on the coupler pin 5.

Each fixed bushing 6b, which is interfittingly mounted into the bushing hole 34 of the internal link 3, is so formed as to have a length dimension capable of ensuring, when tractional forces act thereon at the time of being assembled as the track link 2, a pressure receiving surface able to cope with the resulting load, and it is arranged such that seal rings 7, 7 are housed on both sides of the fixed bushing 6b. Therefore, as described above, the thickness T of the bushing hole's 34 formation part is made greater than the thickness t of the coupler pin hole's 43 formation part of the external link 4. In comparison with the thickness dimension t of the coupler pin hole's 43 formation part of the external link 4, the thickness dimension T of the bushing hole's 34 formation part may be set such that the internal link's 3 side (bushing hole formation part) thickness is about 1.1 times at minimum, and preferably about 1.3 times, that of the external link's 4 side thickness, in which case one of the seal rings 7 is disposed on the coupler pin fixing side as conventionally. Additionally, for the purpose of further enhancing strength, the thickness dimension T of the bushing hole's 34 formation part can be increased to about two times the thickness dimension t of the coupler pin hole's 43 formation part of the external link 4. However, if the thickness dimension T is made greater to a further extent, this increases the width dimension of the track link 2, as a result of which the width dimension of tracker rollers must be increased. Consequently, the underbody size increases, which is economically inefficient. In view of this, the ratio of the thickness dimension T to the thickness dimension t, i.e., T/t, is set to 1.5 in the present embodiment. Additionally, if the T/t ratio is set to 1.4, this produces economical advantages.

As described above, in manufacture of the internal and external links 3, 4 of the present embodiment, their outer shape is formed by mold forging. Because of the arrangement that the boss part 44 provided around the coupler pin hole 43 and the boss part 36 provided around the bushing hole 34, each of which is a substantial part of the main body part, are formed into a gently bulging-out shape, workability in the molding process becomes favorable, and the substantial parts can be formed thick without trouble. Each of the coupler pin hole 43, the bushing hole 34, and the bolt insertion holes 37b, 48b provided through the track shoe mount surfaces 38, 49 is machined.

The track 1 with a rotatable bushing of the present embodiment constructed in the above-described way is assembled as follows. That is, the internal and external links 3, 4 are sequentially interconnected by interfitting of the coupler pins 5 to the associated bushings 6, and the track shoes 8 are fastened to the track shoe mount surfaces 38, 49 of the internal and external links 3, 4 by the bolts 10 and the nuts 11 through the bolt insertion holes 37b, 48b. The track 1 thus assembled is wound around the sprocket and idler of the vehicle body.

The track 1 with a rotatable bushing of the present embodiment is constructed as follows. That is, in the internal link 3, in order to provide a structure required for supporting the bushing 6, the relevant portion (i.e., the boss part 36) is formed thick. On the other hand, in the external link 4, the concavely curved surface 45a, which corresponds to the shape of the boss part 36 defining the bushing hole 34 of the internal link 3, provides a structure required for mounting the coupler pin 5. Such a combination of the internal and external links 3, 4 is fastened to the track shoe 8, thereby providing a structure totally balanced in terms of strength. Therefore, it becomes possible to rationally solve the strength problems presented by the prior art techniques. Besides, the arrangement that the seal rings 7 for the bushing mounting part are housed together in the internal link 3 makes it possible to achieve improvement in the assembly and, in addition, it is ensured that entrance of powder dust into the inside of the fixed bushings 6b is prevented without fail. Therefore, bearing functions are performed in a smooth manner, thereby making it possible to achieve improvement in the durability.

Figure 7:
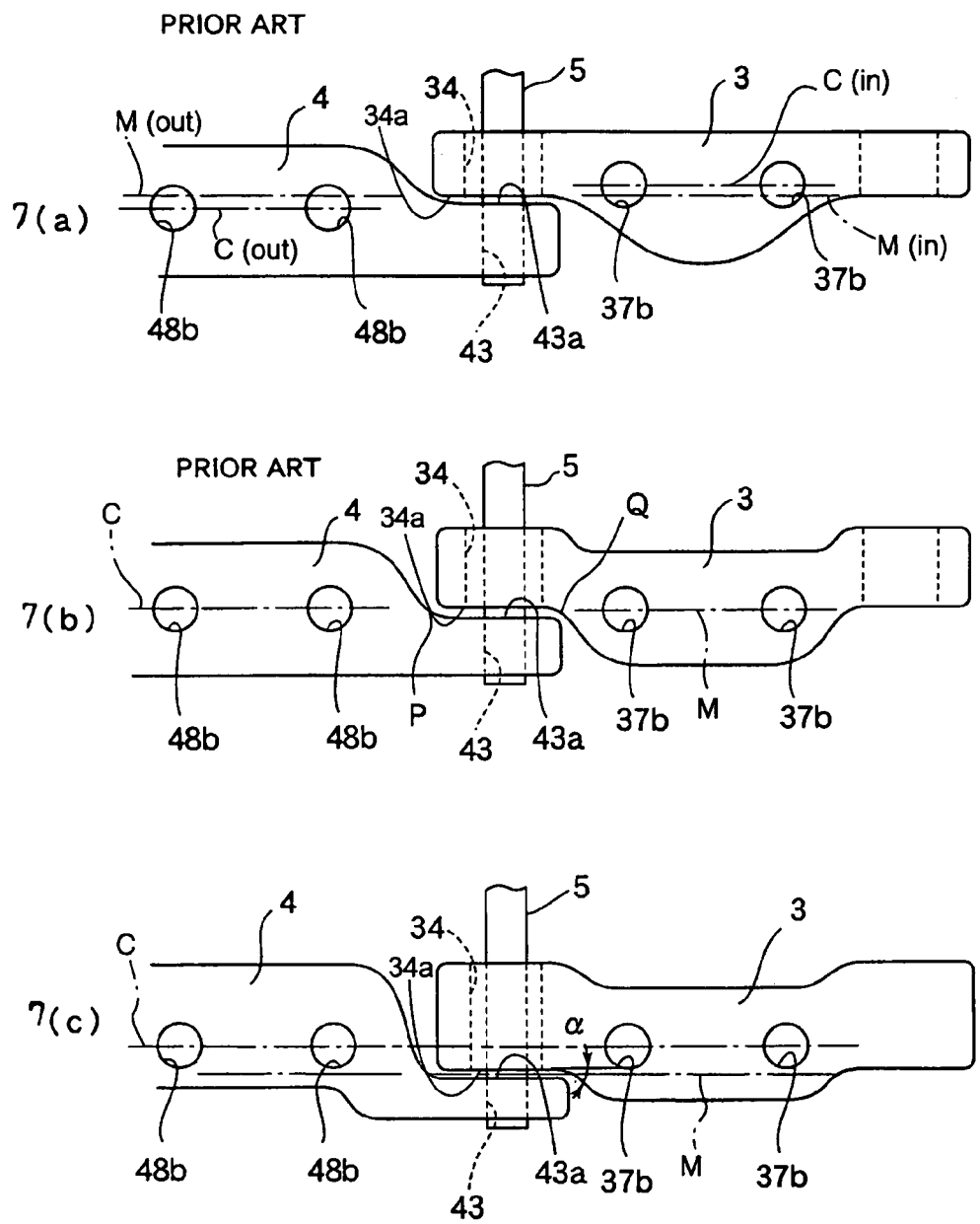
FIG. 7 is explanatory diagrams illustrating the positional relationship between the inner end surface of a coupler pin hole of the external link and bolt insertion holes formed in the internal and external links.

Referring to FIG. 7, there will be explained the positional relationship between the inner end face 43a of the coupler pin hole 43 of the external link 4 and each of the bolt insertion holes 37b, 48b of the internal and external links 3, 4. Also, the relationship between the thickness dimension of the bushing hole 34 of the internal link 3 and the thickness dimension of the coupler pin hole 43 of the external link 4 will be explained. In FIGS. 7(a) to 7(c), the parts that are substantially equivalent to those of the present embodiment are indicated with the same reference numerals as used in the present embodiment.

FIG. 7(a) is a partial plan view diagrammatically illustrating a track according to a first prior art technique. In the first prior art technique, when the internal link 3 is viewed in plan, the front and rear confronting surfaces 34a, 34a of the internal link 3 relative to the front and rear external links 4 are on a straight line M (in) that is parallel to the coupling direction of the internal link 3 and the external link 4. A line C (in), which connects the central axes of the bolt insertion holes 37b for coupling of the internal link 3 to the track shoe 8, is located on the side (i.e., the upper side in FIG. 7(a)) of the straight line M (in) which side is opposite to the confronting external link 4 side. The external link 4 has the same configuration as does the internal link 3 and is oriented differently from the internal link 3. The confronting surfaces 43a, 43a of the external link 4 relative to the front and rear internal links 3 are on a straight line M (out) parallel to the coupling direction of the internal link 3 and the external link 4. A line C (out), which connects the central axes of the bolt insertion holes 48b, 48b, is situated on a side (i.e., the lower side in FIG. 7(a)) of the straight line M (out) which side is opposite to the confronting internal link 3 side. In this configuration, the bolt insertion holes 37b, 48b are not arranged on a straight line. This gives rise to a problem that a common track shoe cannot be used for the internal and external links 3, 4.

As an attempt to solve the above problem, there has been proposed a second prior art technique as shown in FIG. 7(b). According to this technique, the bolt insertion holes (37b, 48b) are aligned such that the straight line M (M(in), M(out)) on which the confronting surface is situated is made to be substantially coincident with the line C (C(in), C(out)) that connects central axes of the bolt insertion holes (37, 48) of the link (the internal link 3, the external link 4). More specifically, since the internal and external links 3, 4 are required to have a clearance at their confronting area because they rock around the coupler pin 5, the bolt insertion holes (37b, 48b) are positioned on a straight line M (hereinafter referred to as "the contact plane of the internal and external links 3, 4") located intermediate between the confronting surface 34a of the internal link 3 and the confronting surface 43a of the external link 4, when coupling the internal and external links 3, 4. This structure enables use of a common track shoe.

However, the link arrangement of the second prior art technique (FIG. 7 (b)) has revealed the following problem. Concretely, corner areas (cross-section transition areas) P, Q which largely change in cross-sectional area are subjected to the heaviest stress in the internal and external links 3, 4. The stress imposed on the cross-section transition area P is not so heavy because the coupler pin 5 is press-fitted into the coupler pin hole 43 of the external link 4 and therefore the external link 4 is retained and supported by other members. On the other hand, the cross-section transition area Q is susceptible to great distortion and therefore severe stress because the internal link 3 is not retained by other members.

The present invention has proposed the arrangement shown in FIG. 7(c) with a view to overcoming the above problems. According to this arrangement, the thickness-wise dimension of the coupler pin hole 43 of the external link 4 having the cross-section transition area P subjected to relatively small stress is reduced whereas the thickness-wise dimension of the bushing hole 34 of the internal link 3 having the cross-section transition area Q subjected to relatively great stress is increased. In other words, the positions of the bolt insertion holes 37b, 48b (=the thicknesses of the insertion parts for the coupler pin 5 in the internal and external links 3, 4) are so determined that a line C connecting the central axes of the bolt insertion holes 37b, 48b is located at a position more interior than the contact plane of the internal and external links 3, 4 (at an upper position in FIG. 7(c)). Thereby, the configuration of the internal link 3 when viewed in plan can be made as follows. The flexion angle (curvature) a of a curved portion (see FIG. 7(c)) of the internal link 3 with respect to the outer end surface 34a of the bushing hole 34 of the internal link 3 can be reduced, compared to the second prior art technique. As a result, stress concentration can be avoided in the area most liable to rigidity shortage due to stress concentration. It should be noted that the aforesaid curved portion changes in sectional shape from the outer end surface 34a of the bushing hole 34 of the internal link 3.

Figure 8:
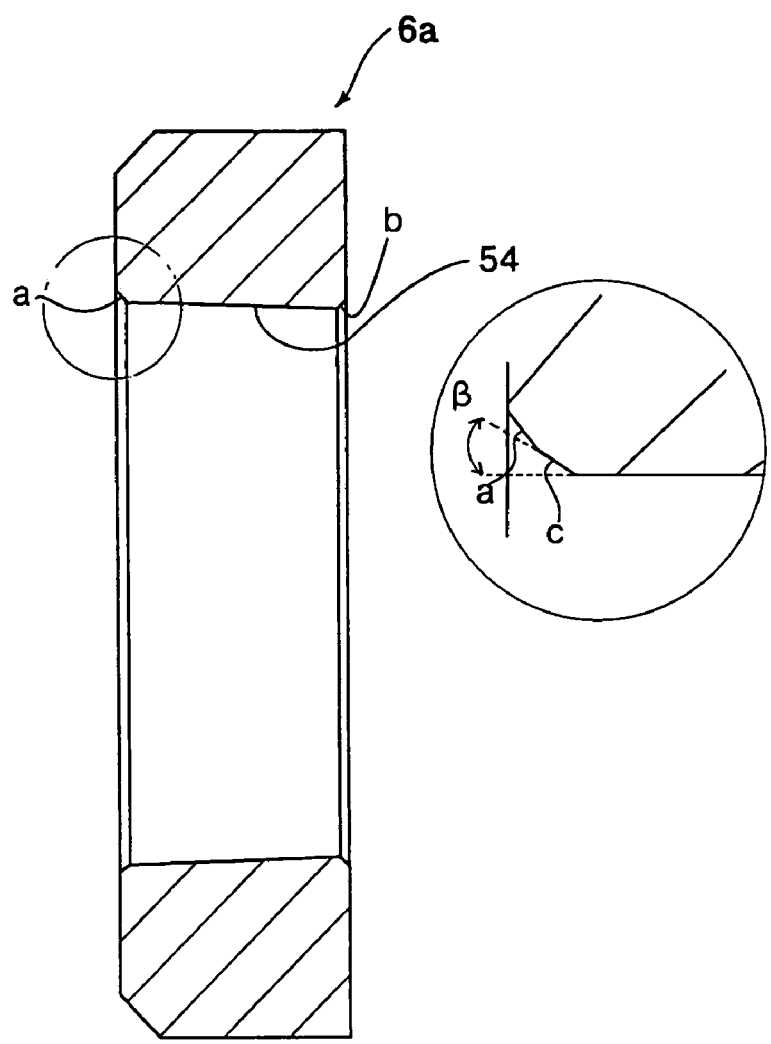
FIG. 8 is a cross sectional view of a second embodiment of a fixed bushing.
Figure 9:
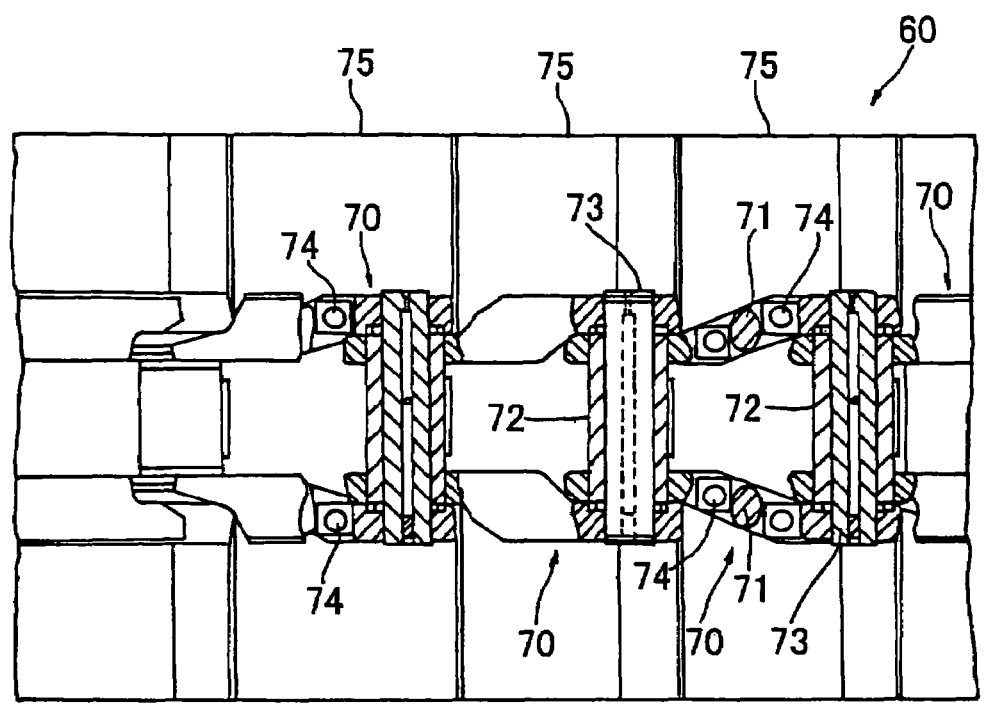
FIG. 9 is structural explanatory diagrams of a track constructed according to a prior art technique.
Figure 9:
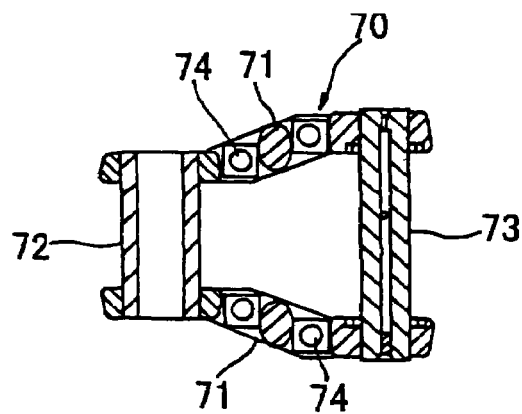

Next, the detailed configuration of each fixed bushing 6b will be explained with reference to FIG. 8. In this embodiment, the fixed bushing 6b of the internal link 3, into which the coupler pin 5 is inserted, has chamfer portions a, b at both ends of an inner circumferential surface 54 thereof. A tapered surface c is formed with an inclination angle β of 1.2 degrees at the outer end (the left end in FIG. 8) of the inner circumferential surface 54 such that it is getting larger toward the chamfer portion a (an enlarged view of the tapered surface c is shown within the circle of FIG. 8). With this configuration, even if flexure occurs in the coupler pin 5 as traction forces increase, imposing of a great stress upon the inner circumferential surface of the fixed bushing 6b due to the flexure can be avoided. Although the tapered surface c is provided at the outer end (the left end in FIG. 8) of the fixed bushing 6b in FIG. 8, it may be provided over the entire area of the inner circumferential surface 54 between the chamfer portions a, b.

It is apparent that other modes based on knowledge obtainable from studies of the drawings, detailed description of the invention and claims of the invention by the person skilled in the art fall in the scope of the technical concept of the invention.

What is claimed is:

1. A track for use in a track-type vehicle, comprising:
track links each constructed by alternately interconnecting an external link and an internal link;
a coupler pin for coupling the external link and the internal link;
a rotatable bushing interposed between the right and left internal links and rotatably supported by the coupler pin;
a coupler pin hole which is provided in the external link and into which the coupler pin is press-fitted,
a bushing hole provided in the internal link;
a fixed bushing interfittingly inserted into the bushing hole;
a first bolt insertion hole provided in a track shoe mount surface of the external link; and
a second bolt insertion hole provided in a track shoe mount surface of the internal link;
wherein the first bolt insertion hole and the second bolt insertion hole are arranged on a straight line and the straight line connecting the first bolt insertion hole and the second bolt insertion hole is situated at a position more interior than a contact plane of the external link and internal link.

2. The track according to claim 1,
wherein the thickness dimension of the bushing hole provided in the internal link is greater than the thickness dimension of the coupler pin hole provided in the external link.

3. The track according to claim 1 or 2,
wherein the inner circumferential surface of the fixed bushing in the internal link has a cylindrical surface and a tapered surface connected to and in contact with the cylindrical surface, the tapered surface having an increasing diameter that increases outwardly relative to the cylindrical surface as the tapered surface extends from the cylindrical surface towards an exterior of the fixed bushing.

* * * * *

UNITED STATES PATENT AND TRADEMARK OFFICE
CERTIFICATE OF CORRECTION

PATENT NO. : 7,661,774 B2
APPLICATION NO. : 11/896526
DATED : February 16, 2010
INVENTOR(S) : Teiji Yamamoto et al.

It is certified that error appears in the above-identified patent and that said Letters Patent is hereby corrected as shown below:

On the Title Page
Item (54) & Col. 1 lines 1-2 should read:
-- TRACK COMPRISED OF INTERNAL AND EXTERNAL LINKS --.

Signed and Sealed this

First Day of June, 2010

David J. Kappos
*Director of the United States Patent and Trademark Office*